United States Patent [19]

Schuck

[11] 4,259,907
[45] Apr. 7, 1981

[54] ARRANGEMENT FOR THE TRANSFER OF CONVEYED ARTICLES BETWEEN INTERSECTING TRACKWAYS

[75] Inventor: Ludwig Schuck, Darmstadt-Arheiligen, Fed. Rep. of Germany

[73] Assignee: Carl Schenck Ag, Darmstadt, Fed. Rep. of Germany

[21] Appl. No.: 35,596

[22] Filed: May 3, 1979

[30] Foreign Application Priority Data

Sep. 9, 1978 [DE] Fed. Rep. of Germany ....... 2839339

[51] Int. Cl.³ ............................................. E01B 13/00
[52] U.S. Cl. ..................................... 104/48; 104/135; 198/574; 414/134
[58] Field of Search ................. 104/135, 130, 131, 48, 104/88; 198/574, 485; 414/134, 136

[56] References Cited

U.S. PATENT DOCUMENTS

| 3,732,992 | 5/1973 | Busam ..................................... 104/48 |
| 3,877,386 | 4/1975 | Wakabayashi ........................... 104/88 |
| 3,913,758 | 10/1975 | Faircloth et al. ........................ 104/48 |

*Primary Examiner*—Richard A. Bertsch
*Attorney, Agent, or Firm*—Connolly and Hutz

[57] ABSTRACT

This invention relates to an arrangement for engaging the relative elevation of two intersecting trackways for conveying and transferring freight goods in two conveying directions. One of the conveyors has rollers for engaging the flat bottoms of the freight bins and the other has flat tracks for receiving the wheels which project a short distance below the bottoms of the bins. The flat tracks are disposed at an elevation which is high enough to use the flat bottoms of the bins to clear the rollers in the intersecting conveyor. The portion of the tracks which intersects the roller conveyor is movable downwardly on eccentric cams a sufficient distance to drop the bins on the rollers to accomplish the transfer. Raising the flat track portion on the cams accomplishes transfer in the opposite direction.

6 Claims, 3 Drawing Figures

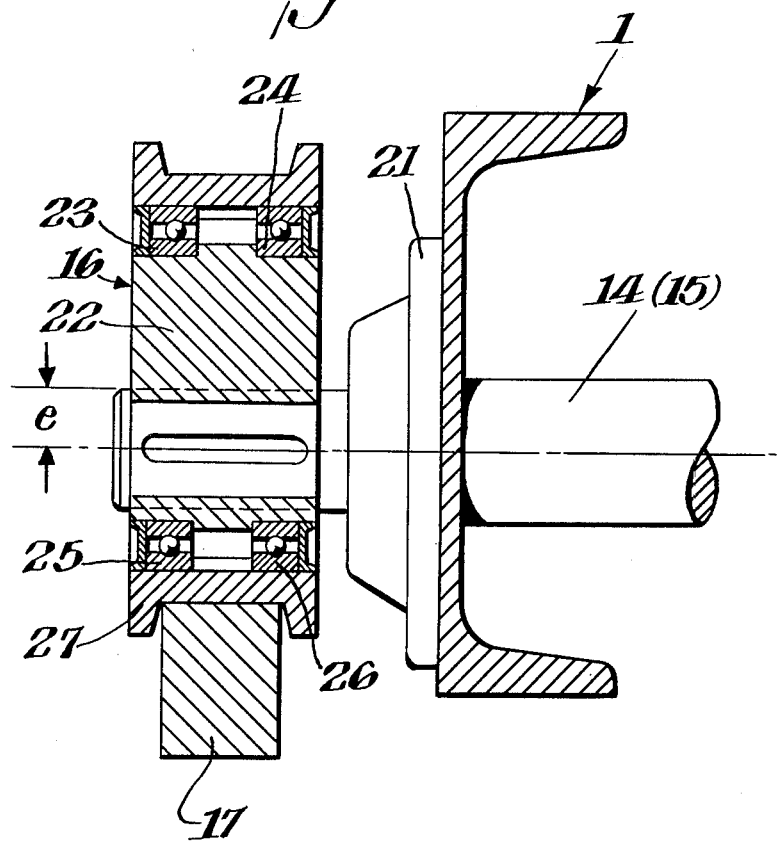

ARRANGEMENT FOR THE TRANSFER OF CONVEYED ARTICLES BETWEEN INTERSECTING TRACKWAYS

BACKGROUND OF THE INVENTION

In freight conveyance, it is required that goods be transported over long stretches and also in directions perpendicular to the original conveying direction for example, involving the transfer of the load to a larger planar bearing support. Previously, hoists have been used at certain points for this purpose which raise the freight goods coming in one direction in order to deposit them onto a conveying track pointing in a different direction. It has also been known to provide conveying devices in place of hoists which are shaped like a conveying table and whereby the rollers movable in the outgoing direction point with their axes in the direction of the original conveying direction. Such transfer devices are expensive and subject to breakdowns and require, furthermore, considerable space. In addition, in chip board plants requiring the vertical movement of cutting saws, it has become known to lift them by means of a cam which collaborates with a roller, in order that the cutting saw becomes disengaged from the poured out chip board flow. In doing so, considerable horizontal forces occur which must be absorbed by means of supplemental structures.

SUMMARY

Emanating from this state of the art, the object of the invention is to effect a turning of heavy loads for further conveyance in a different horizontal conveying direction, wherein the resulting horizontal forces are negligible. This object is solved, according to the invention, in that the intersecting portion of the first trackway is elevatable relative to the second by means of eccentric cams with roller bearings and that the cam is driven by means of a shaft arranged on the first trackway. By the novel support of the cams by means of roller bearings which bear upon a stationary rail, it is achieved that the outer ring of the roller bearing reacts against the rail and that the transferring forces, which must be applied in horizonal direction, in order to achieve a precise vertical movement corresponding to the above-mentioned eccentricity, are merely, in the order of magnitude of the roller bearing friction. Furthermore, a lifting device, constructed in accordance with the invention, is driven with a considerably lower electrical load than a device which carried out the lifting movement vertically by means of a hoist, and in the novel lifting device it is also not necessary to have critical requirement regarding a precise cut-off point, because the mode of operation of the cam provides a smooth flowing entry into the lower position or into the elevated position in contrast to vertical conveyors.

An embodiment of the subject matter of the invention has both trackways supporting conveyance in horizontal directions. In yet another embodiment of the invention, it is suggested that the outside ring of the roller bearing have a race with a double flange. Such embodiment enables a precise conveyance in the X and Y directions, so that in the lifting movement, the trackway to be raised does not go out of alignment. This measure is particularly advantageous when the track to be raised relates to a rail track which is to be connected without interruption to a further rail track of similar profile. The cam is arranged so that its motion characteristic or curve upon raising the trackway does not immediately require maximum output because the load curve corresponds to a sine curve. The use of the energy, stored in the rotational moment of the motor, is thus available for overcoming the maximum load forces.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 2 is a cross-sectional view taken through FIG. 1 along line 2—2 showing the eccentric cam and rail.

DESCRIPTION OF THE PREFERRED EMBODIMENTS

Figure 1:
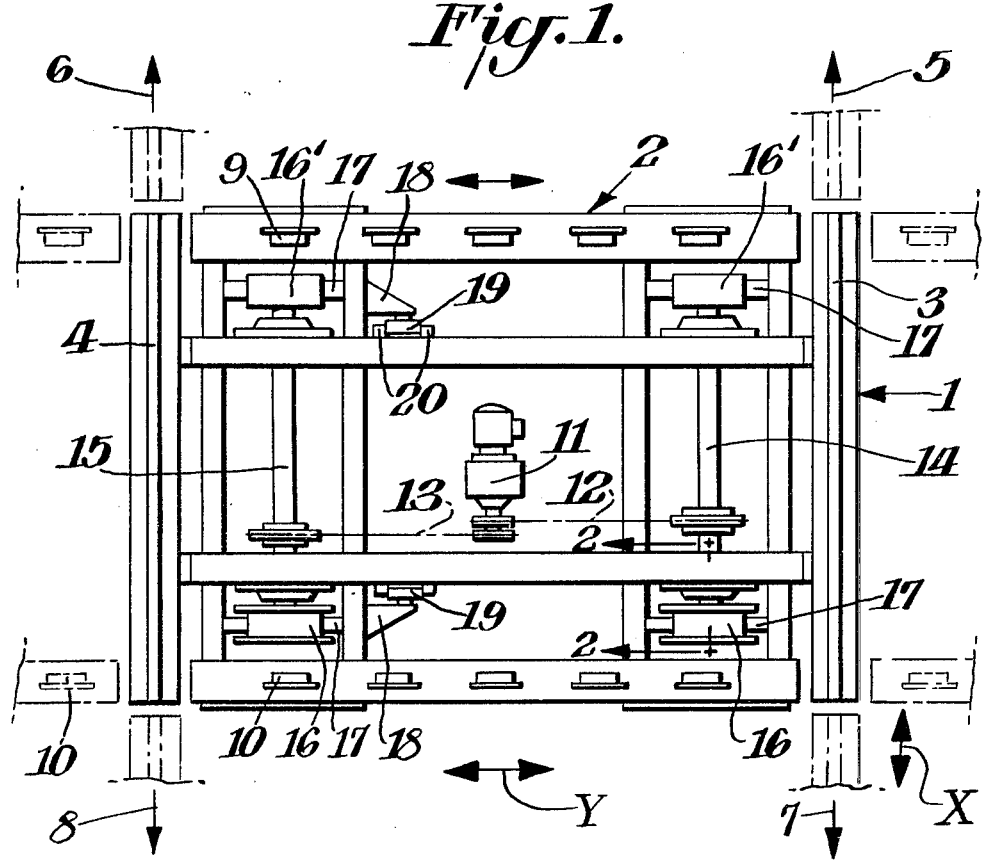
FIG. 1 is a top plan view of a lifting arrangement of one embodiment of this invention.
Figure 3:
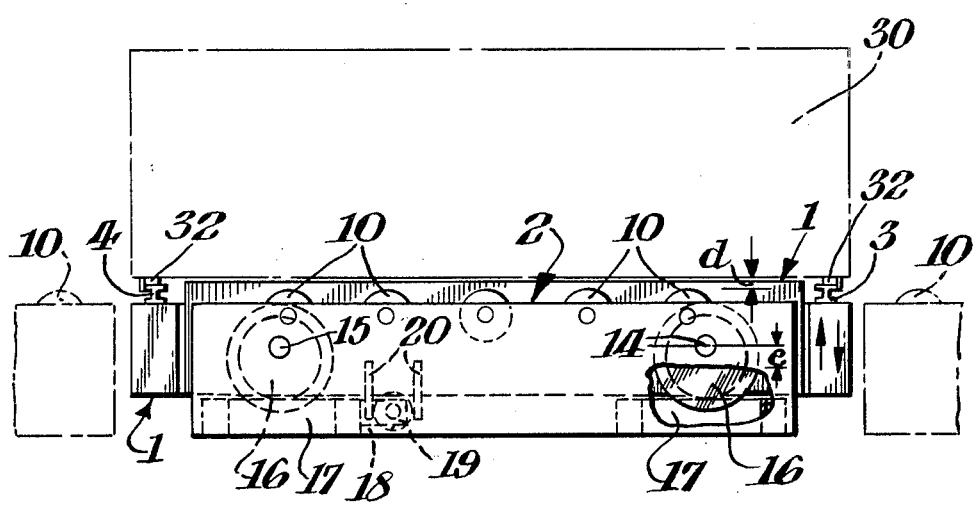
FIG. 3 is a side elevation view of the embodiment shown in FIGS. 1 and 2 showing the one trackway in its full raised position.

According to FIGS. 1 and 3, a first trackway 1 is related movably in vertical direction withh a second trackway 2. Here, the first trackway 1 carries rails 3, 4, which may be interconnected with similar rails, arranged in the direction of arrows 5, 6 or 7, 8 whereby a freight container 30, provided with wheels 32, may be conveyed. The second trackway 2 incorporates gravity rollers 9 and 10, for example, which as schematically illustrated, extend vertically from trackway 2 and laterally to the rails 3, and 4. The gravity roller conveyors 9 and 10, which may also be comprised of flanged rollers, contact from below the container 30 to be conveyed.

For the transition from the one into the other conveying track direction, chain drives 12, 13 on shafts 14, 15 mounted on first trackway 1, are actuated by means of motor 11. On the ends of the shafts, cams 16 are supported on short horizontal rails 17, which are connected with the second trackway 2. The first trackway 1 is restrained in the horizontal direction by rollers 19, arranged by means of mountings 18 from trackway 2, in vertical guideways 20 attached to trackway 1.

In FIG. 2, the mode of operation of the novel lifting device is explained in more detail. Driven shaft 14 or 15 is supported by means of a bearing 21 on first trackway 1 and connected with an eccentric hub 22 of cam 16. Arranged on the eccentric hub 22 are roller bearings 23, 24 whose outside ring 25, 26 carries a double flanged roller 27 which engages around rail 17. If shaft 14 or 15 is then driven and the first trackway 1 is engaged within vertical guideways 20, the double race is lowered by the amount "e", due to the rotation of the roller bearings from their raised position on the rail with the bottom of container 30 above the level of roller conveyors 9, 10 into its lower position with the bottom of container 30 resting in rollers 9 and 10. FIG. 3 shows how support of container 30 is accordingly transferred from wheels 32 on track 3 to container 30 bottom resting on rollers 9 and 10. The distance "d" from the bottom of container 30 to rollers 9 and 10 when wheels 32 of container 30 are disposed in rails 3 in their raised position is accordingly less than "e", the extent of movement of eccentric cams 16.

As shown in FIG. 1, two of the cams 16 carry a double flange, while the other two cams 16' carry a smooth ring. It is also feasible that for the guiding of the two trackways 1 and 2, only one double flange (not shown) on roller 19 collaborates with vertical guideways 20. As shown in FIG. 1, the novel arrangement may be utilized in the transition from a roller conveyor to a rail conveyor. It may also be utilized between two roller conveyors or when two intersecting rail conveyors are to be raised or lowered relative to each other in order to enable a transition from one conveying direction to the other.

By the arrangement of a race on the roller bearings 23 and 24, which are carried by the eccentric hub 22, it is possible according to the invention, to construct the double flanged roller 27 from material, which in conjunction with rail 17, produces the least possible wear. It is also within the scope of the invention that the roller 27 and rail 17 may be hardened at the point where friction between the two takes place.

FIG. 3 illustrates the first trackway 1 raised on cams 16 above the second trackway 2, so that the incoming freight container 30 being conveyed in the X direction, is positioned above the second trackway 2 to be removed in the Y direction, when trackway 1 is lowered by cam 16 to cause the bottom of container 30 to rest on rollers 9 and 10.

I claim:

1. An arrangement for the transfer of freight containers between two trackways intersecting each other at different conveying levels comprising eccentric cam means mounted on a first of the trackways, cam reaction surface means on a second of the trackways, the eccentric cam means bearing against the cam reaction surface means, the eccentric cam means incorporating roller bearing means for minimizing frictional resistance to operation of the eccentric cam means, and driving means connected to the eccentric cam means whereby the eccentric cam means is rotated to change the relative elevation between the two trackways in transferring the freight container from one trackway to the other, the roller bearing means has an outer race, the outer race having a double flange, the cam reaction surface means being a short flat rail, and the outer race of the roller bearing means being disposed against the short rail with its double flanges engaged around it.

2. An arrangement as set forth in claim 1, wherein the first and second trackways are substantially horizontally disposed and intersect each other at approximately right angles.

3. An arrangement for the transfer of freight containers between two trackways intersecting each other at different conveying levels comprising eccentric cam means mounted on a first of the trackways, cam reaction surface means on a second of the trackways, the eccentric cam means bearing against the cam reaction surface means, the eccentric cam means incorporating roller bearing means for minimizing frictional resistance to operation of the eccentric cam means, the driving means connected to the eccentric cam means whereby the eccentric cam means is rotated to change the relative elevation between the two trackways to the other, the first trackway comprises a flat rail trackway, the second trackway comrpises a roller trackway, the roller trackway incorporating a series of rollers having aligned upper surfaces, the freight container having wheels projecting downwardly from its bottom in substantial alignment with the flat trackway, the bottom of the container being disposed a short distance above the aligned upper surfaces of the rollers when the wheels of the freight container rest upon the first trackway when the first trackway is elevated, and the eccentric cam means being constructed and arranged to provide a change in elevation which is greater than the distance between the bottom of the container and the aligned upper surfaces of the rollers whereby the freight container is transferred from wheeled contact with the flat rail trackway to flat bottom contact with the aligned upper surfaces of the rollers on the second trackway by rotating the eccentric cam means to cause the relatively lower position of the first trackway.

4. An arrangement as set forth in claim 3, wherein vertical roller and guide means connects the two trackways in a manner which preserves their relative horizontal orientation throughout all vertical positions.

5. An arrangement for the transfer of freight containers between two trackways intersecting each other at different conveying levels comprising eccentric cam means mounted on a first of the trackways, cam reaction surface means on a second of the trackways, the eccentric cam means bearing against the cam reaction surface means, the eccentric cam means incorporating roller bearing means for minimizing frictional resistance to operation of the eccentric cam means, and driving means connected to the eccentric cam means whereby the eccentric cam means is rotated to change the relative elevation between the two trackways in transferring the freight container from one trackway to the other, the drive means comprises a shaft on the eccentric cam means, a motor on the first trackway, and chain and sprocket means connect the motor with the shaft.

6. An arrangement for the transfer of freight containers between two trackways intersecting each other at different conveying levels comprising eccentric cam means mounted on a first of the trackways, cam reaction surface means on a second of the trackways, the eccentric cam means bearing against the cam reaction surface means, the eccentric cam means incorporating roller bearing means for minimizing frictional resistance to operation of the eccentric cam means, and driving means connected to the eccentric cam means whereby the eccentric cam means is rotated to change the relative elevation between the two trackways in transferring the freight container from one trackway to the other, the cam reaction surface means comprises short rails mounted on the second trackway, the roller bearing means have an outer race, and the outer bearing race of the eccentric cam means contacts the short rails.

* * * * *